(12) United States Patent
Chhawacharia

(10) Patent No.: US 11,119,990 B1
(45) Date of Patent: Sep. 14, 2021

(54) SYSTEMS FOR EXTRACTING DATA FROM XML-BASED DIGITAL PROCESS AUTOMATION AND MANAGEMENT PLATFORMS TO DATABASES

(71) Applicant: BANK OF AMERICA CORPORATION, Charlotte, NC (US)

(72) Inventor: Ajay Chhawacharia, Woodland Hills, CA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/848,253

(22) Filed: Apr. 14, 2020

(51) Int. Cl.
*G06F 16/30* (2019.01)
*G06F 7/00* (2006.01)
*G06F 16/21* (2019.01)
*G06F 16/958* (2019.01)
*G06F 16/22* (2019.01)
*G06F 16/28* (2019.01)
*G06F 16/957* (2019.01)

(52) U.S. Cl.
CPC .......... *G06F 16/211* (2019.01); *G06F 16/221* (2019.01); *G06F 16/2282* (2019.01); *G06F 16/284* (2019.01); *G06F 16/957* (2019.01); *G06F 16/958* (2019.01)

(58) Field of Classification Search
CPC .... G06F 16/211; G06F 16/958; G06F 16/221; G06F 16/284; G06F 16/2282; G06F 16/957
USPC ......................................................... 707/803
See application file for complete search history.

(56) References Cited

U.S. PATENT DOCUMENTS

| | | | |
|---|---|---|---|
| 2003/0037069 A1* | 2/2003 | Davison | G06F 40/166 |
| 2006/0173865 A1* | 8/2006 | Fong | G06F 40/151 |
| 2009/0182703 A1* | 7/2009 | Nachimuthu | G06F 16/86 |
| 2009/0300063 A1* | 12/2009 | Neil | G06F 16/258 |
| 2011/0289118 A1* | 11/2011 | Chen | G06F 16/81 |
| | | | 707/803 |
| 2013/0060816 A1* | 3/2013 | Hui | G06F 16/86 |
| | | | 707/802 |
| 2018/0150529 A1* | 5/2018 | Mcpherson | G06F 9/542 |
| 2020/0402177 A1* | 12/2020 | Olariu | G06F 16/901 |

* cited by examiner

*Primary Examiner* — Kuen S Lu
(74) *Attorney, Agent, or Firm* — Michael A. Springs; Moore & Van Allen PLLC; James C. Edwards

(57) ABSTRACT

Automated end-to-end exporting of XML-based data and uploading in tabular format to target databases. Primary/foreign keys are intelligently created to associate/tie together the hierarchal relationships that exist in the nested XML data. As such, the data can be loaded into the databases while maintaining the requisite hierarchal relationships of the data elements. In addition, the exporting and upload process is independent of target database schema as the invention provides for generating and deploying scripts that define the database schema within the target database.

18 Claims, 4 Drawing Sheets

SYSTEMS FOR EXTRACTING DATA FROM XML-BASED DIGITAL PROCESS AUTOMATION AND MANAGEMENT PLATFORMS TO DATABASES

FIELD OF THE INVENTION

The present invention relates to computer data transformation and, more specifically, extracting extensible markup language (XML)-based data from related applications, transforming the data to tabular format and loading the data to a target without any predefined database schema and without any predefined primary/foreign key relationships in the XML-based data.

BACKGROUND

Many applications, such as certain Business Process Managements (BPM) applications store data in binary large objects (BLOB) format, which is not human-readable when exported directly to a database. However, within an enterprise setting a need typically exists to perform database-related analytics or the like on the data generated by such applications and to pass the data to downstream systems for further processing.

In specific instances, some of these applications are configured to allow for exporting XML-based data directly to a designated storage location. However, since the data is still in XML format, an intermediate system or the like needs to be implemented to transform the data into a human-readable form before the data is uploaded to a target database or the like.

In other specific instances, some of the applications are configured to allow for direct export and upload of XML-based data to target databases; however, such direct exporting and uploading places a significant burden on the application side. For example, mappings need to be established between the source file and the targeted database. This also means that any time a specific field in the data file changes the mapping need to change or the data will be lost. In addition, such mapping typically requires participation by both the source and the target, which means that in the event the source or target is a third-party entity, administration credentials or the like may be required to be shared amongst the parties. Sharing of administration credentials is undesirable because it places a security threat on the application.

Therefore, a need exists to be able to directly export XML-based data from application files to a target database absent the need to pre-map the data fields in the XML-based files to corresponding fields in the database. In this regard, a need exists to able to directly export/upload XML-based data from application files to a target database absent the need to share credentials amongst entities that would otherwise be required to pre-map the data fields. Further, a desired need exists to directly export XML-based data from application files to a target database absent the need to pre-define the database schema that is to be implemented at the target. Further, a desired need exists to directly export XML-based data from application files to a target database absent the need for exported data to have predefined relationships between the data elements.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer program products, methods and the like for exporting XML-based data from related applications and uploading the data in tabular format to target databases. The invention provides for the exporting and uploading of the data to occur in one continuous automated process that is, in some embodiments of the invention, initiated by a single user input (i.e., a one-click process) or triggered automatically.

Specifically, the present invention provides for taking nested data elements in the XML file, which have no parent/child data element relationships when the XML structure is transformed to flat file format and intelligently creating primary/foreign keys that associate related data elements. As such, according to the present invention, there is no need to map the data fields in the source file to corresponding data fields in the target database prior to executing the data extraction and upload process. By eliminating the need to pre-map the data fields, the present invention also eliminates the need to exchange application administration rights and credentials among the application users and the target database users.

In addition, the present invention provides for generating scripts that define the database schema for the data elements. As such, since the present invention generates the database schema as part of the overall data extraction and upload process, the present invention, eliminates the need for the target database schema be known prior to, or otherwise used in, the data extraction and upload process. In further embodiments of the present invention, scripts for loading the data in the database are generated and implemented. Such scripts are instrumental if errors occur in the loading process or if there exists a need to load the data in other databases in the future.

A system for extracting data from Extensible Markup Language (XML)-based files to a target defines first embodiments of the invention. The system includes a source computing platform including a first memory and at least one first processing device in communication with the first memory. The first memory is configured to store one or more applications that generate XML-based files. The system additionally includes a target computing platform including a second memory and at least one second processing device in communication with the second memory. The second memory is configured to store data extracted from the XML-based files. Additionally, the system includes a data extraction and upload computing platform including a third memory and at least one third processing device in communication with the third memory. The third memory stores instructions that are executable by the third processing device. The instructions are performed in an automated end-to-end fashion. The instructions are configured to receive one or more of the XML-based files from at least one of the applications stored in the first memory of the source computing platform and read XML data in the XML-based files. Additionally, the instructions are configured to parse the XML data into tabular format including generating data keys that establish hierarchical relationships for data elements in the XML data. While the XML data has nested data, it does not include data keys that indicate the relationships, as such, once the data is converted to flat file format there is no means for determining the relationships between various data elements in the file. The present invention generates primary/foreign keys that define the related data and structures related tables. In addition, the instructions are configured to generate one or more first scripts for defining, within the second memory of the target computing platform, a database schema comprising a plurality of tables, and deploy and execute the first script at the target computing platform to create the database schema including the plurality of tables. As such, according to the present invention the database schemas are not predefined but, instead, are generated as part of the data extraction process. In addition, the instructions are configured to load the data elements into the plurality of tables while maintaining the hierarchical relationships established for the data elements.

In specific embodiment of the system, the instructions are further configured to generate one or more second scripts for loading the data elements into the plurality of tables and execute the second scripts to load the data elements into the plurality of tables.

In other specific embodiments of the system, the instructions configured to parse the XML data are further configured to determine excluded data elements in the XML data and exclude the excluded data elements from further processing and being loaded into the plurality of tables.

In further specific embodiments of the system, the instructions are further configured to generate an error log for any error occurring in (i) reading and parsing the XML data, and (ii) generating and executing the first scripts.

In further embodiments of the system, the instructions are further configured to generate a log of the second scripts that do not execute to completion, and, in response to correcting one or more error related to a script not executing to completion, access the log to determine which second scripts to re-execute for completing the loading of data elements, and re-execute the determined second scripts from a point at which the scripts stop executing.

In additional specific embodiments of the system, instructions configured to parse the XML data into tabular format are further configured to detect a new field in the XML-based data, and the instructions configured to generate one or more first scripts for creating the database schema are further configured to generate one or more first scripts for creating a revised database schema including the new field.

In additional embodiments of the system, the instructions are further configured to generate one or more third scripts for adding one or more new columns to at least one of the tables, and deploy and execute the third scripts at the target computing platform to add the one or more columns to the at least one of the tables.

Additionally, in further embodiment of the system, instructions configured to parse the XML data into tabular format are further configured to (i) create, for each first hierarchical level data element, a first level JavaScript Object Notation (JSON) dictionary, (ii) read each first hierarchical level data element and add to a corresponding first level JSON dictionary an identifier as a first primary key, and (iii) generate a first table name for each first hierarchical level data element based on a partial value of the first primary key and add the first table name to the corresponding first level JSON dictionary. In related embodiments of the system, the instructions configured to parse the XML data into tabular format are further configured to (i) identify a second hierarchical level data element associated with the first hierarchical level data element, (ii) create, for each second hierarchical level data element, a second level JSON dictionary, (iii) create, for each second hierarchical level data element, and add to the second level JSON dictionary, a second primary key using the first primary key, a second hierarchical level data element tag and a second hierarchical level data element subscript, (iv) add the first primary key to the second JSON dictionary as a foreign key to establish a relationship between a first hierarchical level data element and a second hierarchical level data element, (v) generate a second table name for each second hierarchical level data element based on a second hierarchical level data element tag name, and (vi) add the second level JSON dictionary to the first level JSON dictionary.

In such embodiments of the invention, the instructions configured to parse are further configured to in response to identifying one or more additional hierarchical level data elements, iteratively repeat (i) creating, for each additional hierarchical level data element, a level-based JSON dictionary, (ii) creating, for each additional hierarchical level data element, and add to the level-based JSON dictionary, a level-based primary key using a previous level up primary key, an additional hierarchical level data element tag and an additional hierarchical level data element subscript, (iii) adding the previous level up primary key to the level-based JSON dictionary as a foreign key to establish a relationship between a previous level up hierarchical level data element and the additional hierarchical level data element, (iv) generate a table name for each additional hierarchical level data element based on an additional hierarchical level data element tag name, and (v) add the level-based JSON dictionary to a previous level up JSON dictionary.

A computer-implemented method for extracting data from Extensible Markup Language (XML)-based files to a target defines second embodiments of the invention. The method is executed by one or more computer processors and is executed in response to a single user input. The method comprises receiving one or more of the XML-based files from at least one application stored on first memory of a source computing platform and reading XML data in the XML-based files. The method further includes parsing the XML data into tabular format including generating data keys that establish hierarchical relationships for data elements in the XML data. The method further includes generating one or more first scripts for defining, within the second memory of the target computing platform, a database schema comprising a plurality of tables. In addition, the method includes deploying and executing the first script at the target computing platform to create the database schema including the plurality of tables and loading the data elements into the plurality of tables while maintaining the hierarchical relationships established for the data elements.

In specific embodiments the computer-implemented method further includes generating one or more second scripts for loading the data elements into the plurality of tables; and executing the second scripts to load the data elements into the plurality of tables.

In other specific embodiments of the computer-implemented method, parsing further includes determining excluded data elements in the XML data, and excluding the excluded data elements from being loaded into the plurality of tables.

In additional specific embodiments the computer-implemented method further includes generating a log of the second scripts that do not execute to completion, and, in response to correcting one or more error related to a script not executing to completion, accessing the log to determine which second scripts to re-execute for completing the loading of data elements and re-executing the determined second scripts.

Moreover, in additional embodiments of the computer-implemented method, parsing further includes detecting a new field in the XML-based data, and generating the one or more scripts further includes generating one or more first scripts for creating a revised database schema including the new field.

In further specific embodiments of the computer-implemented, parsing further includes (i) creating, for each first hierarchical level data element, a first level JavaScript Object Notation (JSON) dictionary, (ii) reading each first hierarchical level data element and adding to a corresponding first level JSON dictionary an identifier as a first primary key, and (iii) generating a first table name for each first hierarchical level data element based on a partial value of the first primary key and adding the first table name to the corresponding first level JSON dictionary. In related embodiments of the computer-implemented method, parsing further includes (i) identifying a second hierarchical level data element associated with the first hierarchical level data element, (ii) creating, for each second hierarchical level data element, a second level JSON dictionary, (iii) creating, for each second hierarchical level data element, and adding to the second level JSON dictionary, a second primary key using the first primary key, a second hierarchical level data element tag and a second hierarchical level data element subscript, (iv) adding the first primary key to the second JSON dictionary as a foreign key to establish a relationship between a first hierarchical level data element and a second hierarchical level data element, (v) generating a second table name for each second hierarchical level data element based on a second hierarchical level data element tag name, and (vi) adding the second level JSON dictionary to the first level JSON dictionary.

A computer program product including non-transitory computer-readable code defines third embodiments of the invention. The computer-readable code includes a first set of codes for causing a computer processing device to receive one or more of the XML-based files from at least one application stored on first memory of a source computing platform and a second set of codes for causing a computer processing device to read XML data in the XML-based files. In addition, the computer-readable code includes a third set of codes for causing a computer processing device to parse the XML data into tabular format including generating data keys that establish hierarchical relationships for data elements in the XML data. Additionally, the computer-readable code includes a fourth set of codes for causing a computer processing device to generate one or more first scripts for defining, within the second memory of the target computing platform, a database schema comprising a plurality of tables. Moreover, the computer-readable medium includes a fifth set of codes for causing a computer processing device to deploy and execute the first script at the target computing platform to create the database schema including the plurality of tables, and a sixth set of codes for causing a computer processing device to load the data elements into the plurality of tables while maintaining the hierarchical relationships established for the data elements.

In other specific embodiments of the computer program product, the computer-readable code further includes a seventh set of codes for causing a computer processing device to generate one or more second scripts for loading the data elements into the plurality of tables. In such embodiments of the computer program product, the sixth set of codes is further configured to deploy and execute the second scripts at the target computing platform to load the data elements into the plurality of tables.

In additional specific embodiments of the computer program product, the third set of codes is further configured to determine excluded data elements in the XML data and excluding the excluded data elements from being loaded into the plurality of tables.

Thus, systems, apparatus, methods, and computer program products herein described in detail below provide for automated end-to-end exporting of XML-based data from related applications and uploading the data in tabular format to target databases. The present invention relies on nested data elements in the XML files for intelligently creating primary/foreign keys that associate related data elements and resulting related tables. In addition, the present invention generates scripts that define the database schema for the data elements and related tables, thus, obviating the need for the target database schema to be known prior to executing the data extraction and uploading process of the present invention.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
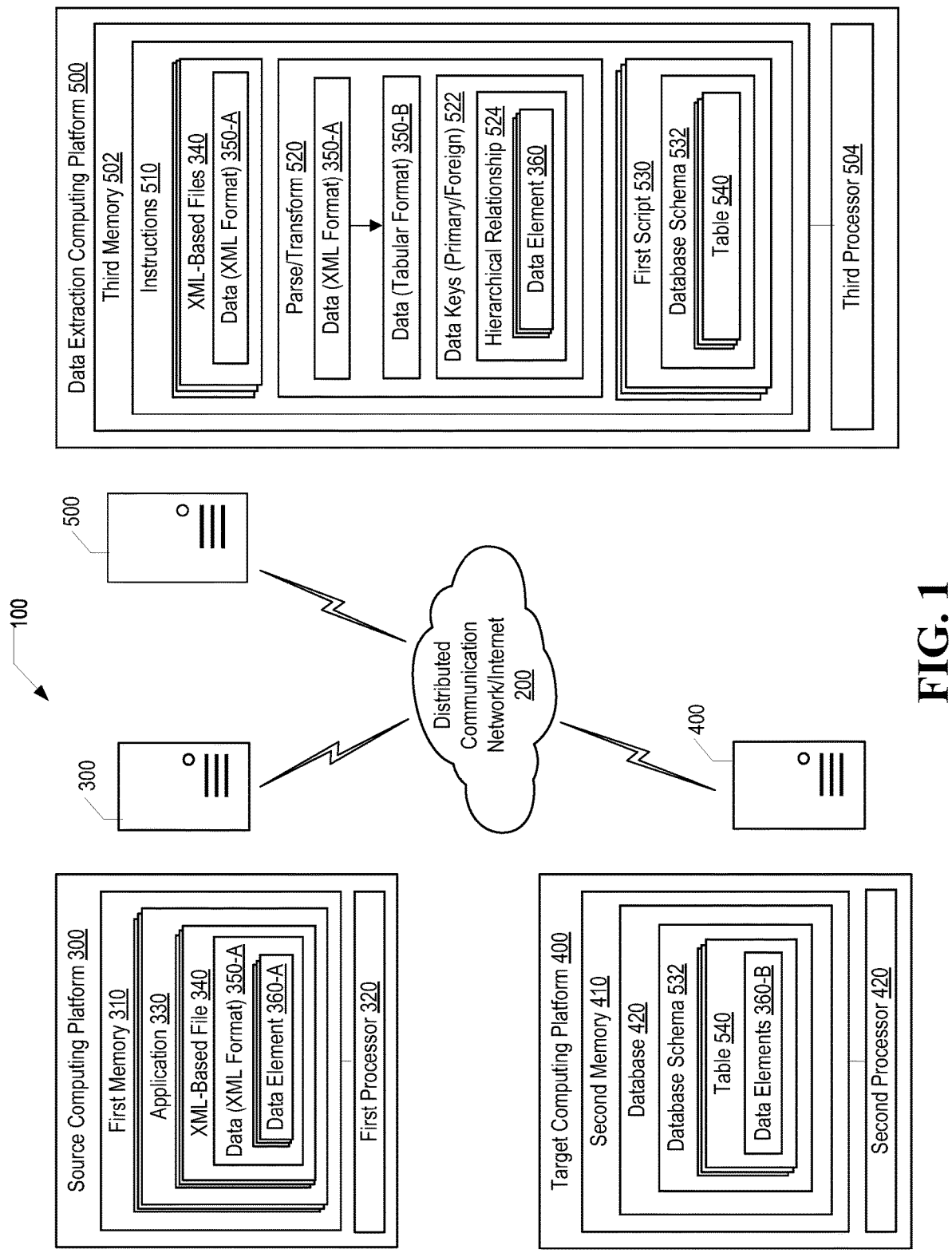
Figure 2:
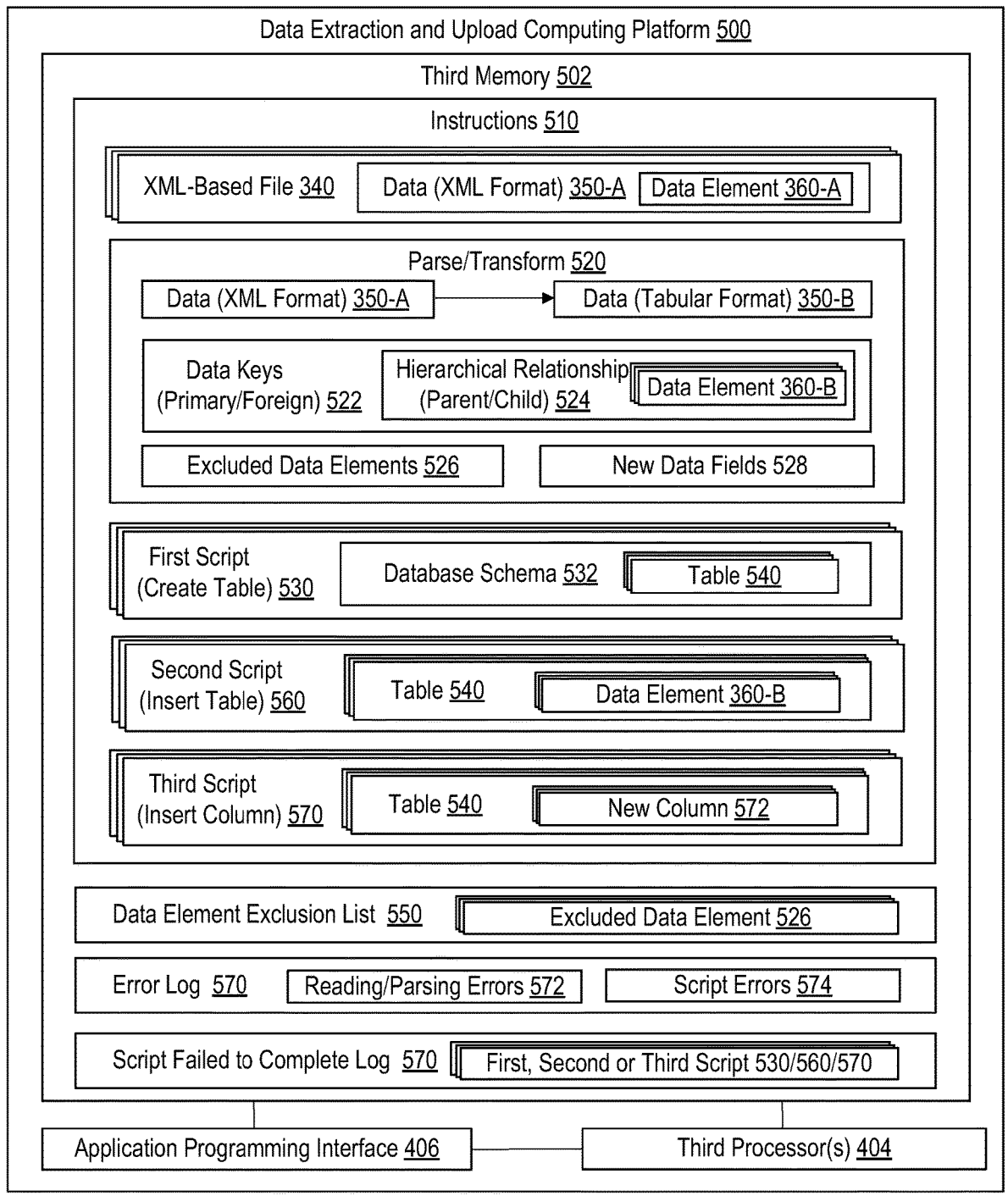
Figure 3:
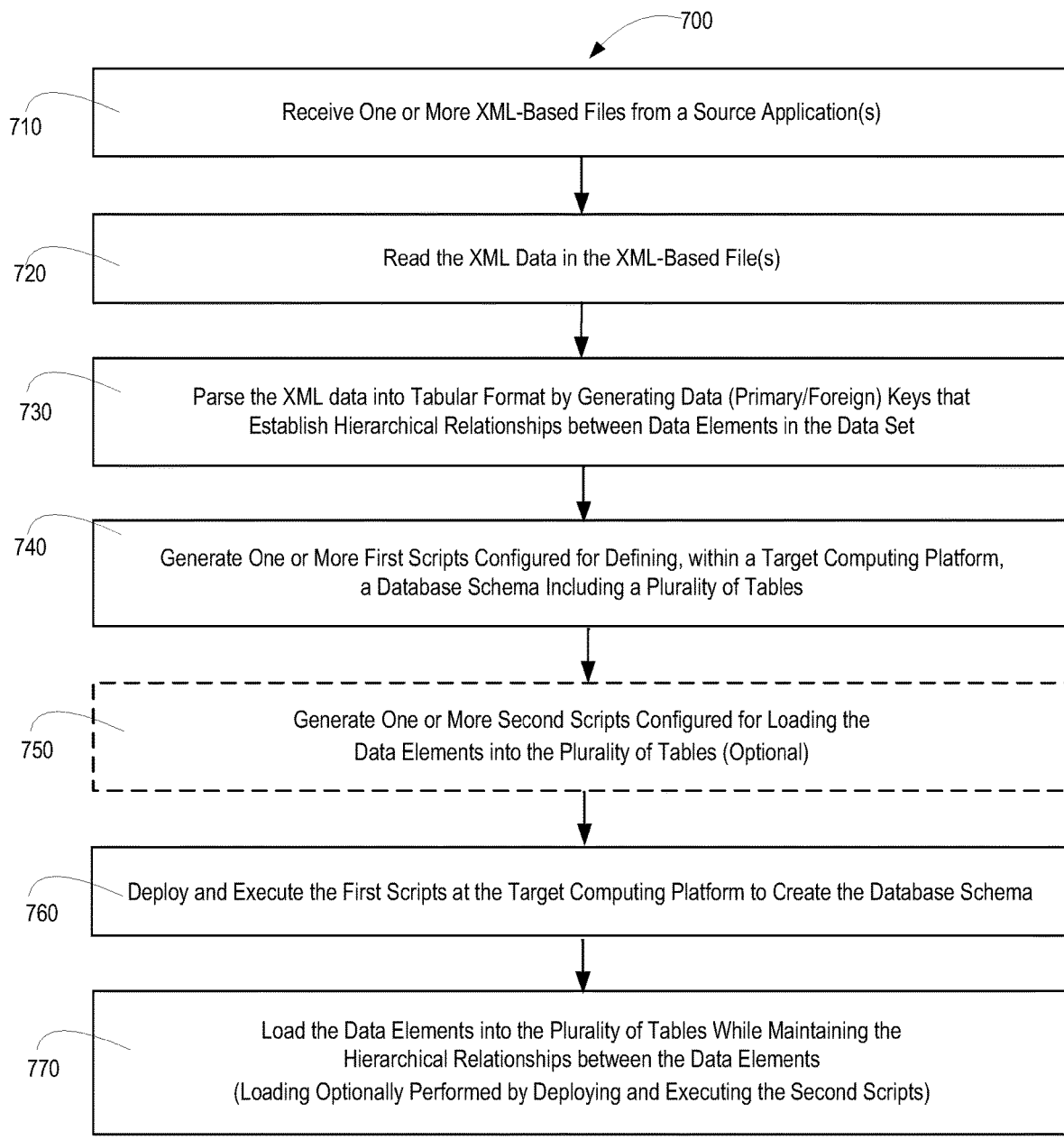
Figure 4:
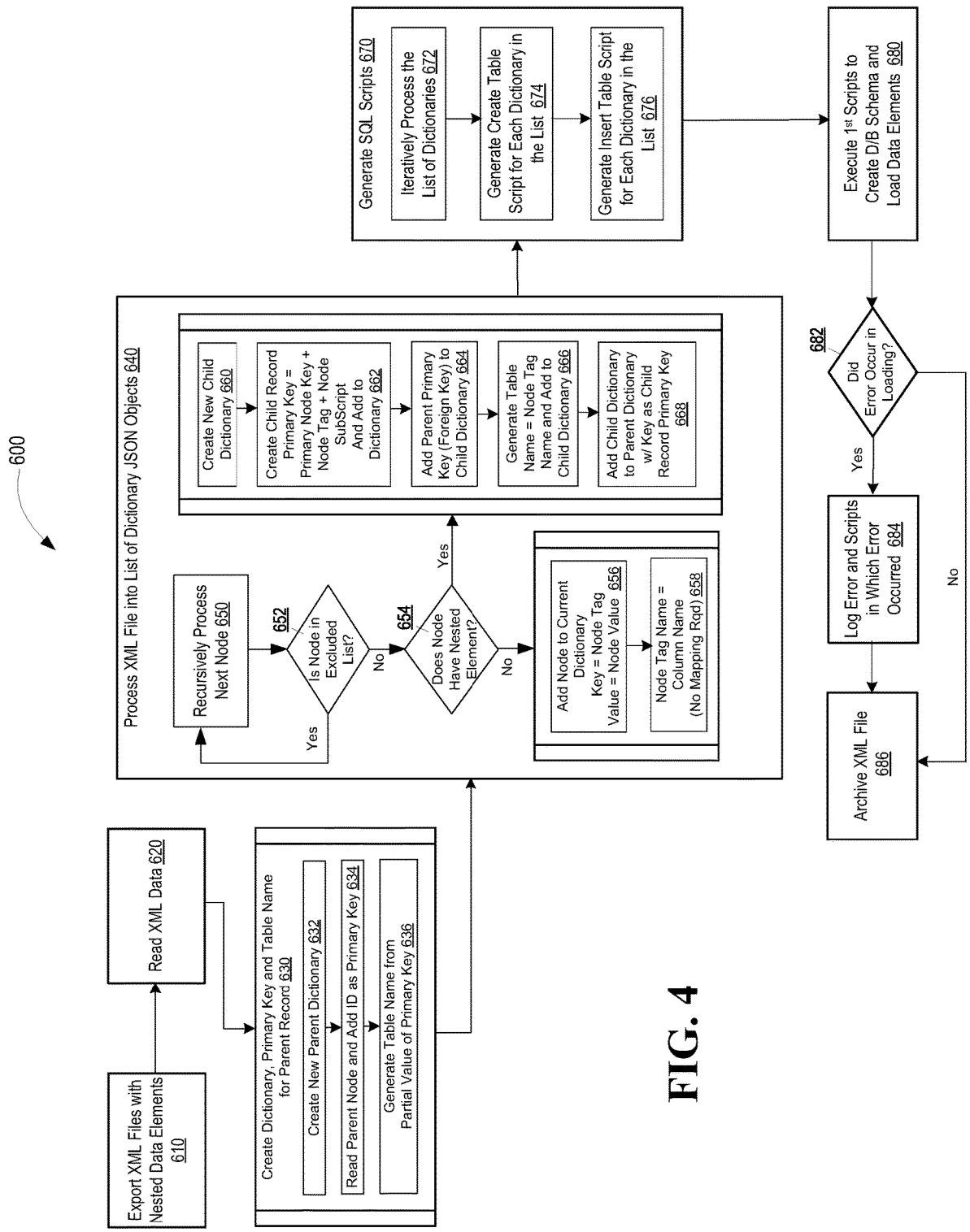

Having thus described embodiments of the invention in general terms, reference will now be made the accompanying drawings, wherein:

FIG. 1 is a schematic diagram of a system for extracting XML-based data from source applications and uploading the data to target databases, in accordance with embodiments of the present invention;

FIG. 2 is a block diagram of a data extraction and upload computing platform configured for extracting XML-based data from source applications and uploading the data to target databases, in accordance with embodiments of the present invention;

FIG. 3 is a flow diagram of a high-level method for extracting XML-based data from source applications and uploading the data to target databases, in accordance with embodiments of the present invention; and FIG. 4 is a flow diagram of a method system/method for extracting XML-based data from source applications and uploading the data to target databases, in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, PYTHON, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for exporting XML-based data from related applications and uploading the data in tabular format to target databases. The invention provides for the end-to-end automated exporting and uploading of the data to occur in one continuous automated process that, in some embodiments, is initiated by a single user input (i.e., a one-click process). In specific embodiments of the invention the applications are Business Process Management (BPM) application which generates XML-based files of data.

The XML-based files have nested data elements, which provide for a means of establishing relationships therein. However, when theses XML-based files are typically transformed to a flat file format, the data elements are un-nested and the relationship between data elements no longer exits. The present invention provides for exporting these nested data elements in the XML-based files and intelligently creating primary/foreign keys that associate related data elements and related database tables. As such, according to the present invention, there is no need to manually configure data export and mapping the data fields prior to executing the novel data extraction and upload process of the present invention.

By eliminating the need to manually pre-configure and pre-map the data fields, there is no need to share user credentials amongst source application users and target database users. As a result, the present invention provides for more source application and/or target database security, in that, both source and target users/developers take a hands-off approach to the export and upload process, data loss is prevented, and duplicate data loading is avoided.

In addition, the present invention provides for generating scripts that define the database schema for the data elements at the target. Unlike other exportation and upload processes in which changes to the target database schema warrant changes to the export and upload process (i.e., re-mapping of data fields and the like), the present invention avoids such changes since the exportation and upload process of the present invention is not dependent on the target database schema.

In further embodiments of the present invention, scripts for loading the data in the database are generated and implemented. Such scripts are instrumental if errors occur in the loading process or if there exists a need to load the data in other databases in the future. For example, data which does not upload, due to any error, is readily identifiable and available and the data loading scripts can be re-executed to prevent data loss. In addition, when the need exists to load the same data in another database, a scripts depository may be accessed to retrieve and execute the requisite scripts, thus, eliminating the need to re-execute the entire data extraction/transformation process.

Moreover, as new data elements are added to the XML-based files, the present invention is able to seamlessly add the new data elements to the export and upload process without losing the data elements or requiring the source application provider and or source application user to reconfigure.

FIG. 1 is a schematic diagram of a system 100 configured for extracting eXtensible Markup Language (XML)-based data from source applications and uploading the data to target databases, in accordance with embodiments of the present invention. The system is implemented in a distributed communication network 200, such as the Internet and/or one or more intranets and the like. The system includes a source computing platform 300 having a first memory 310 and one or more first processors 320 (i.e., processing device) in communication with the first memory 310. The first memory 320 stores one or more applications 330 that are executable by the processor(s) 320 to generate XML formatted data 350-A and store the data 350-A in XML-based files 340. In specific embodiments of the invention the applications 330 include digital process automation and/or management applications; for example, Business Process Automation (BPA) and/or Business Process Management (BPM) applications.

The system 100 additionally includes a target computing platform 400 having a second memory 410 and one or more second processors 420 in communication with the second memory. The second memory 410 is configured to store a database 420 of data extracted from the XML-based files 340 and transformed into tabular format. It should be noted that the database 420 does not have a predefined database schema/structure, but rather, as discussed in greater detail infra., the database schema 532 is generated as part of the data extraction and upload process of the present invention.

Additionally, the system 100 includes data extraction and upload computing platform 500 that includes a third memory 502 and one or more third processors 510 in communication with the third memory 502. The third memory 502 stores instructions 510 that are configured to be executed by the third processor 504 in an automated end-to-end manner (e.g., a so-called "one-click" process that is initiated by a single user input and, absent errors, runs straight-through to completion, (i.e., in this instance, entering all data elements 360 into the database 420) without manual intervention). The instructions 510 are configured to receive one or more XML-based files from at least one of the applications 330 stored in the first memory 310 of the source computing platform 300. In specific embodiments of the system, a user may select one or more folders stored within first memory 310 of the source computing platform 300 and the instructions 510 are configured to scan the folder for all application 330-related XML-based files 340 stored therein and export the XML-based files to the instructions 510. In response to receiving the XML-based files 340, the instructions are configured to read the XML formatted data 350-A and parse/transform 520 the data 350-A into tabular formatted data 350-B. Parsing/transforming 520 the XML formatted data 350-A into tabular formatted data 350B includes intelligently creating data keys 522 (e.g., primary/foreign keys) that establish hierarchical relationships 524 (e.g., parent/child or the like) for data elements 360. As previously discussed, standard XML formatted data 350-A is nested as a means of showing data element relationships; however, once the data is converted to a flat file format the nesting is no longer visible (i.e., the relationships cease to exist). By creating the data keys 522 that tie together the hierarchical relationships 524 as part of the data extraction and upload process, the present invention, eliminates the need for pre-mapping of the data fields in the XML-based files 340 to corresponding data fields in the target database 420. As result of eliminating the mapping, neither the user of the application(s) 330 nor the entity in control of the database 420 need to share administrative credentials, which provides for more overall security to the data itself and the overall extraction and upload process.

In addition, instructions 510 are configured to generate one or more first scripts 530 for generating a database schema 532, which includes a plurality of tables 540, and deploying and executing the first script(s) 530 within the second memory 410 of the target computing device 400 to create the database schema 532 including the tables 540 within database 420. In addition, instructions 510 are configured to load the data elements 360-B into the tables 540 while using the data keys 522 to maintain the hierarchical relationships 524 established for the data elements 360-B. As previously discussed, by generating database schemas 532 as part of the extraction and upload process, the present invention eliminates the need for the database schema to known in advance and provides the basis for readily being able to add new data fields and/or columns as warranted by the application providers and/or application users.

Referring to FIG. 2 a block diagram is depicted of a data exportation and upload computing platform 500 for extracting XML-based data from source applications and uploading the data to target databases, in accordance with embodiments of the present invention. In addition to providing greater detail, FIG. 2 highlights various alternative embodiments of the invention. The data extraction and upload computing platform 500 may comprise one or typically multiple computing devices (e.g., servers or the like) and is configured to execute engines, including instructions, algorithms, modules, routines, applications and the like. Data extraction and upload computing platform 500 includes third memory 502 and the like which may comprise volatile and non-volatile memory, such as read-only and/or random-access memory (RAM and ROM), EPROM, EEPROM, flash cards, or any memory common to computing platforms). Moreover, third memory 502 and the like may comprise cloud storage, such as provided by a cloud storage service and/or a cloud connection service.

Further, data extraction and upload computing platform 500 also includes at least one third processor 504, otherwise referred to as a processing device or the like which may be an application-specific integrated circuit ("ASIC"), or other chipset, logic circuit, or other data processing device configured to execute the instructions 510. Third processing device(s) 504 or the like may execute one or more application programming interface (APIs) 506 that interface with any resident programs, such as instructions 510 or the like stored in the third memory 502 of the data extraction and upload computing platform 500 and any external programs. Third processing device(s) 504 may include various processing subsystems (not shown in FIG. 2) embodied in hardware, firmware, software, and combinations thereof, that enable the functionality of the computing platform 500 and the operability of the computing platform 500 on the distributed communications network 200 (shown in FIG. 1). For example, processing subsystems allow for initiating and maintaining communications and exchanging data with other networked devices, such as source and target computing platforms 300 and 400 (shown in FIG. 1). For the disclosed aspects, processing subsystems of computing platform 500 may include any processing subsystem used in conjunction with instructions 510 and related engines, tools, routines, sub-routines, algorithms, sub-algorithms, sub-modules thereof.

Data extraction and upload computing platform 500 may additionally include a communications module (not shown in FIG. 2) embodied in hardware, firmware, software, and combinations thereof, that enables electronic communications between the computing platform 500 and other network devices, such as, but not limited to, source and target computing platforms 300 and 400 (shown in FIG. 1). Thus, communication module may include the requisite hardware, firmware, software and/or combinations thereof for establishing and maintaining a network communication connection with one or more network devices.

Memory 502 of computing platform 500 stores instructions 510 that are executed in an automated end-to-end manner. The instructions 510 are configured to receive one or more XML-based files 340 from at least one of the applications 330 stored in the first memory 310 of the source computing platform 300. The XML-based files 340 include XML formatted data 350-A comprising data elements/nodes 360-A. In response to receiving the XML-based files 340, the instructions are configured to read the XML formatted data 350-A and parse/transform 520 the data 350-A into tabular formatted data 350-B. Parsing/transforming 520 the XML formatted data 350-A into tabular formatted data 350B includes intelligently creating data keys 522 (e.g., primary/foreign keys) that establish hierarchical relationships 524 (e.g., parent/child or the like) for data elements 360. Standard XML formatted data 350-A is nested as a means of showing data element relationships; however, once the data is converted to a flat file format the nesting is no longer visible (i.e., the relationships cease to exist). By creating the data keys 522 that tie together the hierarchical relationships 524 as part of the data extraction and upload process, the present invention, eliminates the need for pre-mapping of the data fields in the XML-based files 340 to corresponding data fields in the target database 420.

The parsing/transformation 520 also includes identifying excluded data elements 526 and omitting these excluded data elements 526 from further processing including, but not limited to, loading of the excluded data elements 526 in the database. Excluded data elements 526 may include, but are not limited to, undesirable/unnecessary data, proprietary data or the like. In specific embodiments of the invention, third memory 502 stores data exclusion list 550 that includes a list of the excluded data elements 526. As a precursor to generating data keys for associated data elements, instructions 510 may be configured to access the data element exclusion list 550 to determine if the data element/node 360-A is excluded from the data exportation process and, if the data element/node 360-A is in the exclusion list 550, the data element 360-A is omitted from further processing.

Moreover, as subsequent data extraction and upload processes are performed on the same XML-based files, the iterative/recursive nature of the parsing/transformation 520 process, provides for identifying new data fields 528 that have been added by the application provider and/or configured by the application user. Since the process is capable of identifying new data fields and, as discussed infra, adding new columns to the database schema 532, there is no need to perform an independent re-mapping of the source data fields to the target database fields.

In addition, instructions 510 are configured to generate one or more first scripts 530 for generating a database schema 532, which includes a plurality of tables 540, and, once generated, deploy and execute the first script(s) 530 (e.g., Create Table Structured Query Language (SQL) scripts or the like) within the second memory 410 of the target computing device 400 to create the database schema 532 including the tables 540 within database 420.

In addition, instructions 510 are configured to load the data elements 360-B into the tables 540 while using the data keys 522 to maintain the hierarchical relationships 524 established for the data elements 360-B. In optional embodiments of the invention, instructions 510 are further configured to generate one or more second scripts 560 (e.g., Insert Table SQL scripts or the like) for loading the data elements 360-B into the plurality of tables 540. In certain embodiments of the invention, instructions 510 directly load the data elements into the tables without use of second scripts, while in other embodiments of the invention, instructions 510 may generate and deploy for execution the second script(s) to load the data elements into the tables. The second scripts are advantageous in the event that an error occurs in the loading process because the loading processing can be continued from the point of the error and may be subsequently used, at later point in time, if the data is required to be used in a different application and/or environment.

In further optional embodiments of the invention, instructions 510 are further configured to generate third scripts 570 (e.g., Insert Column SQL scripts or the like) for creating one or more new columns 572 in an existing table 540. In certain instances, new columns 572 are necessary in the event that the instructions 510 identify/detect a new data field 528 that requires a new column 572.

Additionally, instructions 510 are configured to log various events that occur in the data extraction and upload process. For example, the instructions 510 are configured to generate one or more error logs 570 that logs any error 572 occurring in the reading and/or parsing/transformation process, as well as, any error 574 occurring in generating, deploying or executing a script. Further, instructions 510 are configured to generate a log 570 that tracks first, second or third scripts that failed to execute completely and/or correctly (i.e., failed to generate the database schema, failed to load all the data elements and/or failed to load one or more new column). In this regard, occur the problem/error associated with the script failing to complete is resolved, the log 570 can be accessed to determine which scripts need to be re-executed and the point within the script at which the script should be re-executed.

Referring to FIG. 3 a flow diagram is presented of a method 700 for extracting XML-based data from source applications and uploading the data to target databases, in accordance with embodiments of the present invention.

At Event 710, one or more XML-based files are received from source applications. In specific embodiments of the invention, one or more application folders may be scanned for XML-based files and the resulting files may be exported/communicated to a processing location. As previously discussed, the source application may be digital process automation and/or managements applications, such as BPA, BPM applications or the like. At Event 720, the XML data is read from the XML-based files.

At Event 730, the XML data is parsed/transformed into tabular format including generating data keys (e.g., primary/foreign keys) that establish hierarchical relationships between data elements in the data set. In specific embodiments of the invention, for the highest/first hierarchical level data, a first level JavaScript Object Notation (JSON) dictionary is created for the first/highest level data element (e.g., parent node/data element) and the first/highest level data element is read and an identifier is added to the dictionary as the primary key. Additionally, a table name is generated from a partial value of the primary key and included in the dictionary.

In such specific embodiments of the invention, once the first level JSON dictionary and the primary key and table name have been added, each data element nested below the first level data element is recursively processed. Initially, a determination as to whether the data element/node is included within an exclusion list (e.g., unnecessary, proprietary data or the like). If the data element/node is included in the exclusion list, the data element/node is excluded from further processing. If the data element/node is not included in the exclusion list, a determination is made as to whether the data element/node another hierarchical level below (i.e., the data element/node has one or more nested elements in the XML-based file). If the data element/node does not have any further hierarchical level below, the data element/node is added to the current JSON dictionary (i.e., the first level JSON dictionary or a subsequent level JSON dictionary depending on the current hierarchical level being processed). The key is defined by the data element/node tag and the value is defined by the data/element value. Additionally, the data element/node tag name is used as the column name, as such no mapping is required with the target table. If the data element/node does have a further hierarchical level below, a new next level (e.g., child) JSON dictionary is created and a next level data element/node primary key is created using the previous level (e.g., parent) data element/node primary key, the data element node tag and the data element/node subscript and, once created, added to the next level JSON dictionary. Additionally, the previous level (e.g., parent) data element/node primary key is added to the next level JSON dictionary as the foreign key to establish the hierarchical relationship. Further, a table name is generated as the data element/node tag name and added to the next level JSON dictionary. In addition, the next level (e.g., child) JSON dictionary is added to the previous level (e.g., parent) JSON dictionary with the next level data element/node primary key. This process continues recursively until all data elements/nodes have been processed.

At Event 740, one or more first scripts are generated that define the database schema including a plurality of tables, for the database within the target computing platform. In this regard, the database schema is not known ahead of time, but rather is created as part of the data exportation and upload process. At optional Event 750, one or more second scripts are generated that are configured for loading the data elements into the plurality of tables. In this regard, the data elements may be loaded directly into the tables without use of a second script, or in other embodiments of the invention, the second script(s) may be generated and used to load the data elements into the tables. As previously discussed, the second scripts are advantageous in the event that an error occurs in the loading process because the loading processing can be continued from the point of the error and may be subsequently used, at later point in time, if the data is required to be used in a different application and/or environment.

At Event 760, the first scripts are deployed and executed at the target computing platform to generate the database schema and, at Event 770, the data elements are loaded into the tables, while maintaining the hierarchical relationships between associated data elements. As previously discussed, the data elements may be directly loaded into the table or, in specific embodiments of the invention, the second scripts may be deployed and executed to load the data elements into the tables.

Referring to FIG. 4 a detailed flow diagram is presented of specific embodiments of a method 600 for extracting XML-based data from source applications and uploading the data to target databases, in accordance with embodiments of the present invention. At Event 610, the XM-based files with nested data element/nodes are exported from one or more applications, such as BPM, BPA applications or the like. As previously discussed, the XML-based files will not be pre-mapped to the target database (i.e., the data fields in the XML-based files will not be mapped to data fields in the target database). In response to exporting the XML-based files, at Event 620, the XML data contained therein is read.

At Event 630, the parsing/transformation process ensues by creating a JSON dictionary, primary key and table name 630 for a first level hierarchal data element/node (e.g., a parent data element/node). This sub-process includes, at Event 632, creating a new JSON dictionary 632 for the first level hierarchal data element/node, at Event 634, reading the first/highest level data element and adding an identifier to the dictionary as the primary key and, at Event 636, generating a table name for the first level hierarchal data element/node from a partial value of the primary key and included in the dictionary.

Once the first level JSON dictionary and the primary key and table name have been added, at Event 640, the remainder of the XML file is processed into a list of JSON, which means that, at Event 650, all of the data elements/nodes are recursively processed. Specifically, at Decision 652, a determination as to whether the data element/node is included within an exclusion list (e.g., unnecessary, proprietary data or the like). If the data element/node is included in the exclusion list, the data element/node is excluded from further processing. If the data element/node is not included in the exclusion list, at Decision 654, a determination is made as to whether the data element/node another hierarchical level below (i.e., the data element/node has one or more nested elements in the XML-based file). If the data element/node does not have any further nesting, at Event 656, the data element/node is added to the current JSON dictionary (i.e., the first level JSON dictionary or a subsequent level JSON dictionary depending on the current hierarchical level being processed). The key is defined by the data element/node tag and the value is defined by the data/element value. Additionally, at Event 658, the data element/node tag name is used as the column name, as such no mapping is required with the target table. If the data element/node does have a further hierarchical level below, at Event 660, a new next level (e.g., child) JSON dictionary is created and, at Event 662, a next level data element/node primary key is created using the previous level (e.g., parent) data element/node primary key, the data element node tag and the data element/node subscript and, once created, added to the next level JSON dictionary. Additionally, at Event 664, the previous level (e.g., parent) data element/node primary key is added to the next level JSON dictionary as the foreign key to establish the hierarchical relationship. Further, at Event 666, a table name is generated as the data element/node tag name and added to the next level JSON dictionary. In addition, at Event 668 the next level (e.g., child) JSON dictionary is added to the previous level (e.g., parent) JSON dictionary with the next level data element/node primary key. This process continues recursively until all data elements/nodes have been processed.

At Event 670, scripts, such as SQL scripts are generated. At Event 672, the list of dictionaries is iteratively looped through to create the scripts. As noted, all data elements/nodes in a dictionary, which are not themselves a dictionary, are part of one table and each embedded dictionary is its own table. At Event 674, CREATE TABLE SQL scripts (i.e., first scripts) are generated for each dictionary in the list (i.e., each database table) and are configured to generate a database schema including the requisite tables. As part of the generation of these scripts, a check may be performed to verify the uniqueness of a column within each table prior to adding the table to the script. At Event 676, INSERT TABLE SQL scripts (i.e., second scripts) are generated for each dictionary within the list and are configured to load data elements into the tables. The data keys (i.e., primary/foreign keys) were previously inserted into the dictionaries, so the tables will have the established hierarchal relationships.

At Event 680, if the database schema has not previously been loaded, the CREATE TABLE SQL scripts are deployed and executed at the target and, where applicable, the INSERT TABLE SQL scripts are deployed and executed to load the data elements into the tables. At Decision 682, a determination is made as to whether any errors occurred in the generation of the database schema and/or loading of the data elements. If an error(s) is determined to have occurred, at Event 684, any errors that occur during generating the database schema or data element loading process are logged, as well as the SQL scripts that were executing at the time of error. The SQL scripts are logged in order to provide for expedited execution of the remainder of the script once the error/problem has been corrected. For loading errors, the process will check to ensure that the column exists in the table and, if not execute an ALTER script to add the table and retry the loading process.

In response to logging the errors and/or scripts or if no errors occurred, at Event the XML data is archived for future reference/auditing purposes.

As evident from the preceding description, the systems, methods and the like described herein represents an improvement in technology, specifically, an automated end-to-end process for exporting XML-based data from related applications and uploading transformed data in tabular format to target databases. The present invention intelligently creates primary/foreign keys that associate related hierarchal data elements and resulting related database tables. In addition, the present invention generates scripts that define the database schema for the data elements and related tables and, in some embodiments generates script for loading the data elements into the resulting database.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for extracting data from Extensible Markup Language (XML)-based files to a target, the system comprising:
    a source computing platform including a first memory and at least one first processing device in communication with the first memory, wherein the first memory is configured to store one or more applications that generate XML-based files;
    a target computing platform including a second memory and at least one second processing device in communication with the second memory, wherein the second memory is configured to store data extracted from the XML-based files; and
    a data extraction and upload computing platform including a third memory and at least one third processing device in communication with the third memory, wherein the third memory stores instructions that are executable by the third processing device to perform end-to-end automated processing and configured to:
        receive one or more of the XML-based files from at least one of the applications stored in the first memory of the source computing platform,
        read XML data in the XML-based files,
        parse the XML data into tabular format including generating data keys that establish hierarchical relationships for data elements in the XML data, wherein generating the data keys comprises:
            creating, for each first hierarchical level data element, a first level JavaScript Object Notation (JSON) dictionary and adding the JSON dictionary to a JSON dictionary list,
            reading each first hierarchical level data element and adding to a corresponding first level JSON dictionary an identifier as a first primary key, and
            generating a first table name for each first hierarchical level data element based on a partial value of the first primary key and adding the first table name to the corresponding first level JSON dictionary,
        generate a plurality of first scripts for defining, within the second memory of the target computing platform, a database schema comprising a plurality of tables, each of the plurality of scripts corresponding to one of the JSON dictionaries in the JSON dictionary list,
        deploy and execute the first scripts at the target computing platform to create the database schema including the plurality of tables, and
        load the data elements into the plurality of tables while maintaining the hierarchical relationships established for the data elements.

2. The system of claim 1, wherein the instructions are further configured to:
    generate one or more second scripts for loading the data elements into the plurality of tables, and
    execute the second scripts to load the data elements into the plurality of tables.

3. The system of claim 2, wherein the instructions are further configured to:
    generate a log of the second scripts that do not execute to completion, and
    in response to correcting one or more error related to a script not executing to completion, access the log to determine which second scripts to re-execute for completing the loading of data elements, and re-execute the determined second scripts.

4. The system of claim 1, wherein the instructions configured to parse the XML data are further configured to:
    determine excluded data elements in the XML data, and
    exclude the excluded data elements from being loaded into the plurality of tables.

5. The system of claim 1, wherein the instructions are further configured to:
    generate an error log for any error occurring in reading and parsing the XML data, and generating and executing the first scripts.

6. The system of claim 1, wherein the instructions configured to parse the XML data into tabular format are further configured to:
    detect a new field in the XML-based data, and wherein the instructions configured to generate one or more first scripts for creating the database schema are further configured to:
generate one or more first scripts for creating a revised database schema including the new field.

7. The system of claim 1, wherein the instructions are further configured to:
generate one or more third scripts for adding one or more new columns to at least one of the tables, and
deploy and execute the third scripts at the target computing platform to add the one or more columns to the at least one of the tables.

8. The system of claim 1, wherein the instructions configured to parse the XML data into tabular format are further configured to:
identify a second hierarchical level data element associated with the first hierarchical level data element,
create, for each second hierarchical level data element, a second level JSON dictionary,
create, for each second hierarchical level data element, and add to the second level JSON dictionary, a second primary key using the first primary key, a second hierarchical level data element tag and a second hierarchical level data element subscript,
add the first primary key to the second JSON dictionary as a foreign key to establish a relationship between a first hierarchical level data element and a second hierarchical level data element,
generate a second table name for each second hierarchical level data element based on a second hierarchical level data element tag name, and
add the second level JSON dictionary to the first level JSON dictionary.

9. The system of claim 8, wherein the instructions configured to parse the XML data into tabular format are further configured to, in response to identifying one or more additional hierarchical level data elements, iteratively repeat (1) creating, for each additional hierarchical level data element, a level-based JSON dictionary, (2) creating, for each additional hierarchical level data element, and add to the level-based JSON dictionary, a level-based primary key using a previous level up primary key, an additional hierarchical level data element tag and an additional hierarchical level data element subscript, (3) adding the previous level up primary key to the level-based JSON dictionary as a foreign key to establish a relationship between a previous level up hierarchical level data element and the additional hierarchical level data element, (4) generating a table name for each additional hierarchical level data element based on an additional hierarchical level data element tag name, and (5) adding the level-based JSON dictionary to a previous level up JSON dictionary.

10. A computer-implemented method for extracting data from Extensible Markup Language (XML)-based files to a target, the method is executed by one or more computer processors, configured to be executed in automated end-to-end manner and comprises:
receiving one or more of the XML-based files from at least one application stored on first memory of a source computing platform;
reading XML data in the XML-based files;
parsing the XML data into tabular format including generating data keys that establish hierarchical relationships for data elements in the XML data, wherein generating the data keys includes:

creating, for each first hierarchical level data element, a first level JavaScript Object Notation (JSON) dictionary and adding the JSON dictionary to a JSON dictionary list
reading each first hierarchical level data element and adding to a corresponding first level JSON dictionary an identifier as a first primary key, and
generating a first table name for each first hierarchical level data element based on a partial value of the first primary key and adding the first table name to the corresponding first level JSON dictionary;
generating a plurality of first scripts for defining, within the second memory of the target computing platform, a database schema comprising a plurality of tables, each of the plurality of scripts corresponding to one of the JSON dictionaries in the JSON dictionary list;
deploying and executing the first scripts at the target computing platform to create the database schema including the plurality of tables; and
loading the data elements into the plurality of tables while maintaining the hierarchical relationships established for the data elements.

11. The computer-implemented method of claim 10, further comprising:
generating one or more second scripts for loading the data elements into the plurality of tables; and
executing the second scripts to load the data elements into the plurality of tables.

12. The computer-implemented method of claim 11, further comprising:
generating a log of the second scripts that do not execute to completion; and
in response to correcting one or more error related to a script not executing to completion, accessing the log to determine which second scripts to re-execute for completing the loading of data elements and re-executing the determined second scripts.

13. The computer-implemented method of claim 10, wherein parsing further comprises:
determining excluded data elements in the XML data; and
excluding the excluded data elements from being loaded into the plurality of tables.

14. The computer-implemented method of claim 10, wherein parsing further comprises:
detecting a new field in the XML-based data; and
wherein generating one or more first scripts further comprises:
generating one or more first scripts for creating a revised database schema including the new field.

15. The computer-implemented method of claim 10, wherein parsing further includes:
identifying a second hierarchical level data element associated with the first hierarchical level data element,
creating, for each second hierarchical level data element, a second level JSON dictionary;
creating, for each second hierarchical level data element, and adding to the second level JSON dictionary, a second primary key using the first primary key, a second hierarchical level data element tag and a second hierarchical level data element subscript,
adding the first primary key to the second JSON dictionary as a foreign key to establish a relationship between a first hierarchical level data element and a second hierarchical level data element;
generating a second table name for each second hierarchical level data element based on a second hierarchical level data element tag name, and adding the second level JSON dictionary to the first level JSON dictionary.

16. The computer-implemented method of claim 10, wherein the third set of codes is further configured to determine excluded data elements in the XML data, and excluding the excluded data elements from being loaded into the plurality of tables.

17. A computer program product comprising non-transitory computer-readable code that is configured to be executed in automated end-to-end manner and including:
- a first set of codes for causing a computer processing device to receive one or more of the XML-based files from at least one application stored on first memory of a source computing platform;
- a second set of codes for causing a computer processing device to read XML data in the XML-based files;
- a third set of codes for causing a computer processing device to parse the XML data into tabular format including generating data keys that establish hierarchical relationships for data elements in the XML data, wherein generating the data keys includes:
  - creating, for each first hierarchical level data element, a first level JavaScript Object Notation (JSON) dictionary and adding the JSON dictionary to a JSON dictionary list
  - reading each first hierarchical level data element and adding to a corresponding first level JSON dictionary an identifier as a first primary key, and
  - generating a first table name for each first hierarchical level data element based on a partial value of the first primary key and adding the first table name to the corresponding first level JSON dictionary;
- a fourth set of codes for causing a computer processing device to generate a plurality of first scripts for defining, within the second memory of the target computing platform, a database schema comprising a plurality of tables, each of the plurality of scripts corresponding to one of the JSON dictionaries in the JSON dictionary list;
- a fifth set of codes for causing a computer processing device to deploy and execute the first scripts at the target computing platform to create the database schema including the plurality of tables; and
- a sixth set of codes for causing a computer processing device to load the data elements into the plurality of tables while maintaining the hierarchical relationships established for the data elements.

18. The computer program product of claim 17, wherein the computer-readable code further comprises:
- a seventh set of codes for causing a computer processing device to generate one or more second scripts for loading the data elements into the plurality of tables, and
- wherein the sixth set of codes is further configured to deploy and execute the second scripts at the target computing platform to load the data elements into the plurality of tables.

\* \* \* \* \*